(12) United States Patent
Okaniwa et al.

(10) Patent No.: US 10,304,439 B2
(45) Date of Patent: May 28, 2019

(54) IMAGE PROCESSING DEVICE, ANIMATION DISPLAY METHOD AND COMPUTER READABLE MEDIUM

(71) Applicant: CASIO COMPUTER CO., LTD., Tokyo (JP)

(72) Inventors: Shoichi Okaniwa, Fussa (JP); Hiroaki Negishi, Hamura (JP); Shigekatsu Moriya, Tokyo (JP); Hirokazu Kanda, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/388,053

(22) Filed: Dec. 22, 2016

(65) Prior Publication Data

US 2017/0270701 A1    Sep. 21, 2017

(30) Foreign Application Priority Data

Mar. 16, 2016 (JP) .................................. 2016-051932

(51) Int. Cl.
*G06F 17/27* (2006.01)
*G06F 17/28* (2006.01)
*G06T 13/00* (2011.01)
*G06T 13/40* (2011.01)
*G10L 13/08* (2013.01)
(Continued)

(52) U.S. Cl.
CPC ............ *G10L 13/08* (2013.01); *G06F 17/279* (2013.01); *G06F 17/2755* (2013.01); *G06F 17/2775* (2013.01); *G06T 13/40* (2013.01); *G06F 17/2836* (2013.01); *G06T 13/00* (2013.01); *G10L 15/26* (2013.01); *G10L 2021/105* (2013.01)

(58) Field of Classification Search
None
See application file for complete search history.

(56) References Cited

U.S. PATENT DOCUMENTS 5,357,596 A * 10/1994 Takebayashi ............. G06F 3/16
                                                          704/251
6,161,083 A * 12/2000 Franz ..................... G06F 17/271
                                                          704/4

(Continued)

FOREIGN PATENT DOCUMENTS

| JP | 2003-085582 A | 3/2003 |
|----|---------------|--------|
| JP | 2006-127371 A | 5/2006 |
| JP | 2011-150221 A | 8/2011 |

OTHER PUBLICATIONS

Pengyu Hong, Zhen Wen, and Thomas S. Huang, Real-time speech-driven expressive synthetic talking faces using neural networks, 2002, IEEE Transactions on Neural Networks.*

(Continued)

*Primary Examiner* — YuJang Tswei
(74) *Attorney, Agent, or Firm* — Scully, Scott, Murphy & Presser, P.C.

(57) ABSTRACT

An image processing device includes a controller and a display. The controller adds an expression to a displayed face image in accordance with an audio when the audio is output. Further, the controller generates an animation in which a mouth contained in the face image with the expression moves in sync with the audio. The display displays the generated animation.

6 Claims, 2 Drawing Sheets

(51) Int. Cl.
    *G10L 15/26*     (2006.01)
    *G10L 21/10*     (2013.01)

(56) References Cited

U.S. PATENT DOCUMENTS

| | | | |
|---|---|---|---|
| 6,250,928 B1* | 6/2001 | Poggio | G09B 19/04 345/473 |
| 2006/0129922 A1* | 6/2006 | Walker | G06F 17/211 715/251 |
| 2009/0132371 A1* | 5/2009 | Strietzel | G06Q 30/02 705/14.46 |
| 2010/0082345 A1* | 4/2010 | Wang | G06T 13/205 704/260 |
| 2016/0110922 A1* | 4/2016 | Haring | G06T 13/40 345/633 |

OTHER PUBLICATIONS

Yotsukura, T. et al., "iFACe: Interactive Facial speech Animation Control systEm for 3D Cartoon Characters", Information Processing Society of Japan, vol. 49, No. 12, Dec. 2008, pp. 3847-3858.

\* cited by examiner

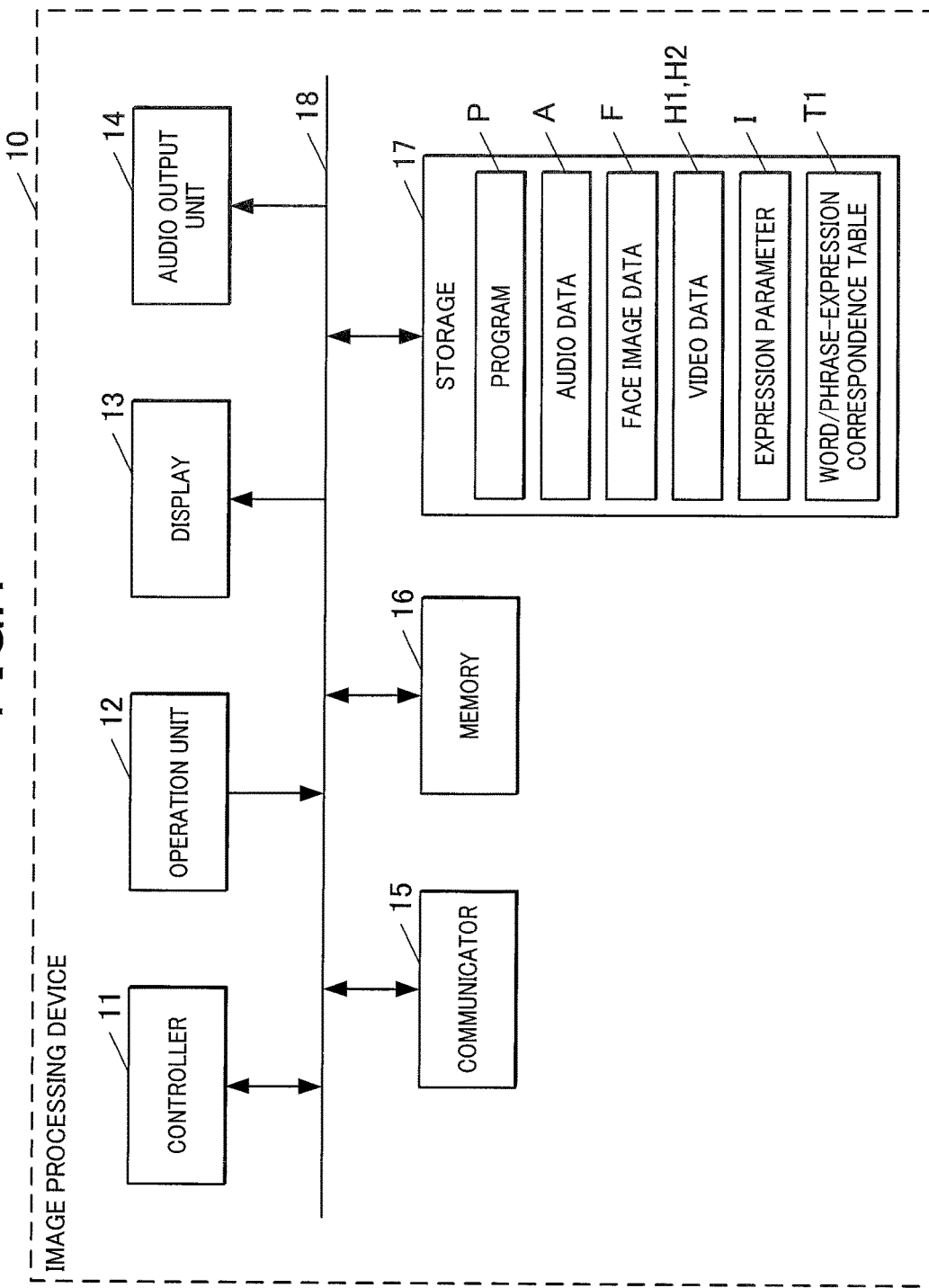

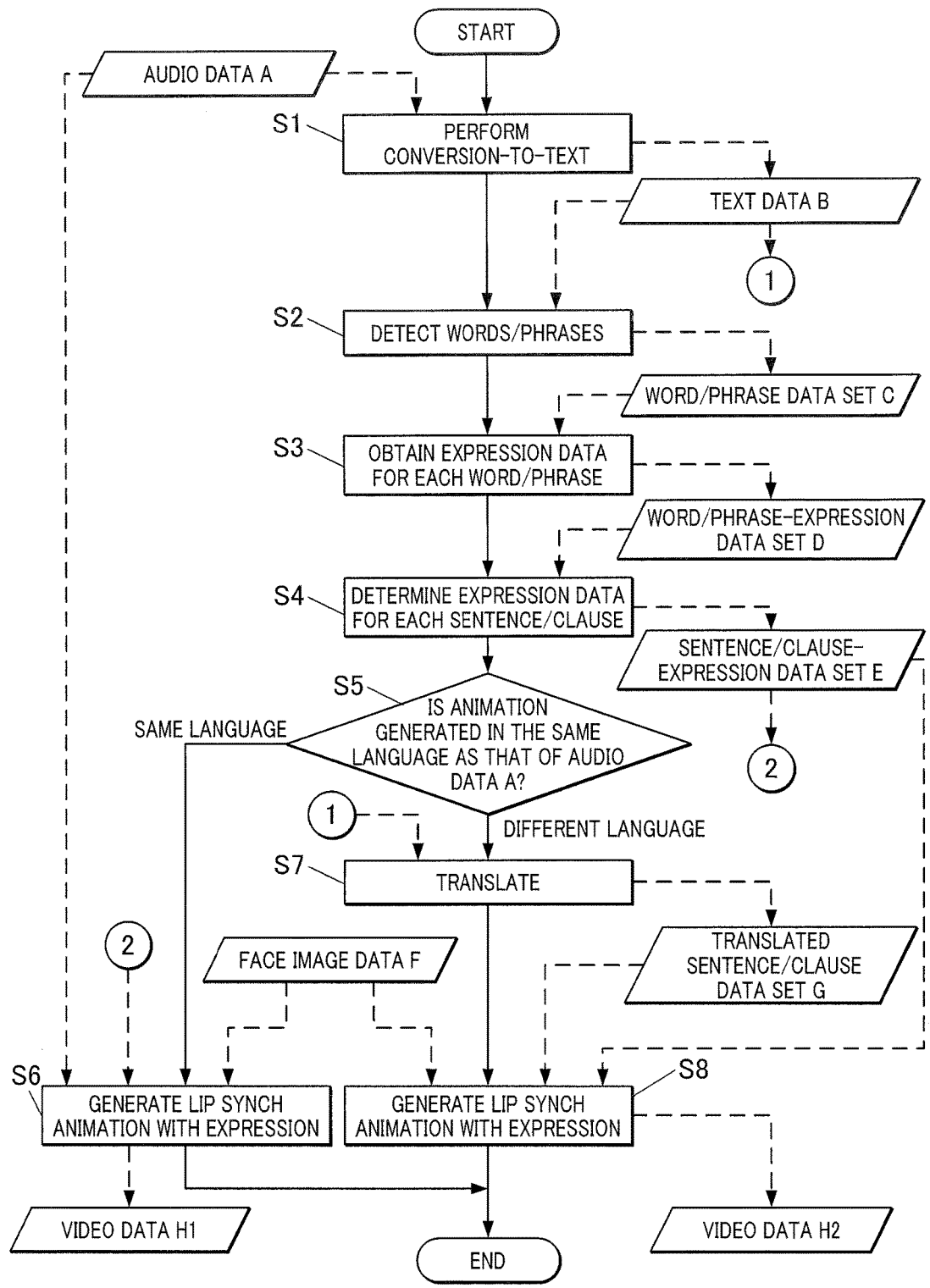

IMAGE PROCESSING DEVICE, ANIMATION DISPLAY METHOD AND COMPUTER READABLE MEDIUM

CROSS-REFERENCE TO RELATED APPLICATIONS

This application is based upon and claims the benefit of priority under 35 U.S.C. 119 of Japanese Patent Application No. 2016-051932 filed on Mar. 16, 2016, the entire disclosure of which, including the description, claims, drawings and abstract, is incorporated herein by reference in its entirety.

BACKGROUND OF THE INVENTION

1. Field of the Invention

The present invention relates to an image processing device, an animation display method and a computer readable medium.

2. Description of the Related Art

There has been known a video output device which can enhance impression to viewers by projecting content to a screen formed in the shape of the contour of the content. (Refer to Japanese Patent Application Publication No. 2011-150221.) For example, by projecting video (moving image) content of a person explaining a product or the like to a screen formed in the shape of the person, a projection image with a sense of presence of the person standing there is obtained.

Further, recently, there has been utilized a technique of generating, on the basis of one face image and audio data, a lip sync animation in which the mouth in the face image moves in sync with the audio. In the lip sync animation, the shape of the mouth changes according to the vowel sound to be made.

By the way, in the case where a screen formed in the shape of a person is used as described in Japanese Patent Application Publication No. 2011-150221, it is preferable to generate a lip sync animation from one face image and display it as the content. This is because if a video of a person is taken to be used as the content, and the person moves during the video taking, the person's image may be not placed within the screen, which requires complicated adjustment.

However, lip sync animations are merely aminations in each of which mouth moves in sync with audio, and thus have a problem of low expressiveness.

BRIEF SUMMARY OF THE INVENTION

Objects of the present invention include improving expressiveness of animations which are generated on the basis of face images.

In order to achieve the above and/or other objects, according to an aspect of the present invention, there is provided an image processing device including: a controller which adds an expression to a displayed face image in accordance with an audio when the audio is output, and generates an animation in which a mouth contained in the face image with the expression moves in sync with the audio; and a display which displays the generated animation.

BRIEF DESCRIPTION OF THE SEVERAL VIEWS OF THE DRAWING

The present invention is fully understood from the detailed description given hereinafter and the accompanying drawings, which are given by way of illustration only and thus are not intended to limit the present invention, wherein:

FIG. 1 is a block diagram showing the functional configuration of an image processing device; and FIG. 2 is a flowchart of an animation generating process performed by a controller shown in FIG. 1.

DETAILED DESCRIPTION OF THE INVENTION

Hereinafter, an embodiment of the present invention is described with reference to the drawings. In the embodiment below, described is a case where an image processing device and a display device of the present invention are applied to a display device 10. The present invention is not limited to the illustrative embodiment.

[Configuration of Display Device 10]

FIG. 1 is a block diagram showing the functional configuration of the display device 10 of the embodiment.

The display device 10 includes a controller 11, an operation unit 12, a display 13, an audio output 14, a communicator 15, a memory 16 and a storage 17, and these units or the like are connected to one another via a bus 18. The display 10 is configured by including an image processing device which can perform video processing.

The controller 11 is constituted of a CPU (Central Processing Unit) which executes various programs stored in the storage 17, thereby performing predetermined mathematical operations and controlling the units or the like of the display device 10. The controller 11 performs an animation generating process shown in FIG. 2 by working together with a program P stored in the storage 17, thereby generating video data H1 or H2, and causes the display 13 to display an animation based on the generated video data H1 or H2.

The operation unit 12 includes: a keyboard including cursor keys, letter input keys, a keypad and various function keys; and a pointing device, such as a mouse, and outputs, to the controller 11, command signals input by key operation to the keyboard or mouse operation.

The display 13 is constituted of a monitor, such as an LCD (Liquid Crystal Display), and displays various screens in response to commands of display signals input from the controller 11.

The audio output unit 14 includes a speaker and a D/A converter, and outputs audio under the control of the controller 11.

The communicator 15 includes a modem, a router and a network card, and communicates with external devices connected to a communication network.

The memory 16 includes a semiconductor memory, such as a DRAM (Dynamic Random Access Memory), and temporarily stores, for example, data to be processed by the units or the like of the display device 10.

The storage 17 includes an HDD (Hard Disk Drive) and/or a nonvolatile semiconductor memory. The storage 17 stores various programs including the program P for the controller 11 to perform various processes, data necessary for execution of these programs and so forth.

For example, the storage 17 stores audio data A and face image data F based on which animations are generated.

The audio data A are data obtained by recording sounds (voices) made by people, and used as audios (voices) of characters which are desired to lip-sync. The audio data A do not contain sounds (noise, background music, etc.) other than the audios. In the embodiment, header information containing information on languages of each audio is added to each audio data A.

The face image data F are data containing images of faces of characters which are desired to lip-sync. Examples thereof include two-dimensional still image data and three-dimensional polygon data.

The storage 17 also stores video data H1 and H2 generated by the animation generating process. The video data H1 and H2 are each composed of a series of frame images constituting a moving image (animation) and audio data for each frame image.

The storage 17 also stores an expression parameter I. The expression parameter I is a parameter which shows the positions of feature points on eyes, mouth, eyebrows and so forth for each expression (e.g., smiley face, angry face, crying face, etc.). By adjusting the shapes of eyes, mouth, eyebrows and so forth on a face image on the basis of the expression parameter I for a desired expression, a face image with a desired expression can be generated.

The storage 17 also stores a word/phase-expression correspondence table T1 where each word/phase is correlated and stored with information on an expression to be imaged (coming to mind) from the word/phase.

[Operation of Display Device 10]

Next, operation of the display device 10 is described.

FIG. 2 is a flowchart of the animation generating process performed in the display device 10. The animation generating process is performed by the controller 11 working together with the program P stored in the storage 17 when, through the operation unit 12, audio data A and face image data F, which are used to generate an animation, and the language of an animation to be generated are specified and also a command to generate an animation is made. The language can be specified from predetermined multiple languages. The specified audio data A, face image data F and language are stored in the memory 16 as setting information.

First, the controller 11 reads, from the storage 17, the audio data A specified through the operation unit 12, and generates text data B by performing conversion-to-text on the audio data A (Step S1).

For the conversion-to-text, existing speech recognition technique is used. For example, the controller 11 converts audio data A of "ご来店ありが とうございます。" ("goraiten arigatou gozaimasu", which means "Thank you for coming to this store." in English)" to text data B of "ごらいてんありが とうございます。(goraiten arigatou gozaimasu)". The controller 11 stores the generated text data B in the memory 16.

Next, the controller 11 detects words/phrases from the text data B, and generates a word/phrase data set C (Step S2).

For the detection of words/phrases, existing word detection technique, such as morphological analysis, is used. For example, the controller 11 detects three words/phrases of "ごらいてん (goraiten)", "ありがとう (arigatou)" and "ございます (gozaimasu)" from the text data B of "ごらいてんありが とうござい ます。". The controller 11 stores the generated word/phrase data set C in the memory 16.

Next, the controller 11 obtains information on an expression for each word/phrase contained in the word/phrase data set C, and generates a word/phrase-expression data set D which indicates the expressions for the respective words/phrases (Step S3).

For example, the controller 11 reads the word/phrase data contained in the word/phrase data set C in order from the first one, and for each word/phrase, obtains, from the word/phrase-expression correspondence table T1 stored in the storage 17, information on an expression correlated and stored with the word/phrase, and generates the word/phrase-expression data set D. For example, the controller 11 obtains the "context dependent" as the expression for the "ごらいてん", obtains the "smiley face" as the expression for the "ありがとう", and obtains the "context dependent" as the expression for the "ございます". Herein, the "context dependent" indicates an expression which depends on the context. The controller 11 stores the generated word/phrase-expression data set D in the memory 16.

Next, the controller 11 determines an expression for each sentence/clause (into which a text is segmented by a punctuation mark (s)) contained in the text data B on the basis of the word/phrase-expression data set D, and generates a sentence/clause-expression data set E which indicates the expressions for the respective sentences/clauses (Step S4).

For example, the controller 11 refers to the word/phrase-expression data set D, and determines the most frequent expression among the expressions for the respective words/phrases contained in the same (one) sentence/clause as the expression for the sentence/clause. For example, in the above case of the "ごらいてんありが とうございます。", the expressions for the respective words/phrases are the "context dependent" for the "ごらいてん", the "smiley face" for the "あ りがとう", and the "context dependent" for the "ございます". Because the "context dependent" indicates an expression which depends on the context, it is ignored. Hence, the controller 11 determines the "smiley face" as the expression for this sentence/clause. The controller 11 stores the generated sentence/clause-expression data set E in the memory 16.

Next, the controller 11 determines whether to generate an animation in the same language as that of the audio data A (Step S5). For example, the controller 11 determines whether to generate an animation in the same language as that of the audio data A on the basis of the setting information stored in the memory 16.

When determining to generate an animation in the same language as that of the audio data A (Step S5; Same Language), the controller 11 generates a lip sync animation with expression(s) on the basis of the audio data A, the sentence/clause-expression data set E and the specified face image data F, and stores video data H1, which is data of the animation, in the storage 17 (Step S6), and then ends the animation generating process.

At Step S6, the controller 11 first generates mouth shape data for each frame, which constitutes an animation, on the basis of the audio data A and the face image data F.

For example, the controller 11 first obtains feature points on the mouth in the face image data F. To be specific, the controller 11 extracts the contour of the mouth from the face image data F by image recognition, and obtains coordinates of feature points on the contour. Next, the controller 11 successively obtains audio data At from the beginning of the audio data A. Each audio data At is for a time length of one frame. Note that if the frame rate of an animation to be generated is Pf (frames/second), and the play time of the audio data A is T (seconds), the controller 11 obtains audio data At each for 1/Pf (seconds/frame). Next, the controller 11 analyzes each audio data At so as to obtain a vowel (s), and determines the mouth shape of the vowel as the mouth shape of the frame corresponding to the audio data At. Then, the controller 11 changes the positions of the feature points on the mouth in the face image data F such that the determined mouth shape can be achieved, and correlates and stores coordinates of the changed feature points as the mouth shape data of the frame corresponding to the audio data At with a frame number in the memory 16.

Next, the controller 11 generates face image data with expression(s) for the audio corresponding to the frames on the basis of the face image data F and the sentence/clause-expression data set E.

First, the controller 11 determines expression (s) to be added to the face image of the frames. For example, the controller 11 identifies each sentence/clause corresponding to the audio data At corresponding to the frames, identifies an expression for the identified sentence/clause on the basis of the sentence/clause-expression data set E, and determines the identified expression as an expression to be added to the face image of the frames. Next, the controller 11 adds the expression to the face image data F on the basis of the expression determined for the frames and the expression parameter I stored in the storage 17, thereby generating face image data of the frames, and stores the generated face image data in the memory 16. Then, the controller 11 (i) changes the shape of the mouth in the face image data of the frames on the basis of the mouth shape data of the respective frames, thereby generating still images of the respective frames, (ii) combines the generated still images of the respective frames, thereby generating an amination, (iii) combines the generated animation with the audio data A, thereby generating video data H1, and (iv) stores the generated video data H1 in the storage 17.

On the other hand, when determining to generate an animation in a language different from that of the audio data A (Step S5; Different Language), the controller 11 translates text data of each sentence/clause contained in the text data B into the language specified by a translation engine, thereby generating a translated sentence/clause data set G constituted of translated data (text data) of the respective sentences/clauses (Step S7). The controller 11 stores the generated translated sentence/clause data set G in the memory 16.

Then, the controller 11 generates a lip sync animation with expression(s) on the basis of the translated sentence/clause data set G, the sentence/clause-expression data set E and the specified face image data F, and stores video data H2, which is data of the animation, in the storage 17 (Step S8), and then ends the animation generating process.

At Step S8, the controller 11 first generates mouth shape data for each frame, which constitutes an animation in the specified language, and correlates and stores the generated mouth shape data, to be specific, coordinates of the feature points on the mouth, with a frame number in the memory 16.

For example, the controller 11 generates audio data in the specified language (hereinafter "audio data J") on the basis of the translated sentence/clause data set G, which is text data after translation, and generates mouth shape data for each frame, which constitutes an animation, on the basis of the audio data J and the face image data F in the same manner as that described for Step S6 (except that the audio data A is replaced by the audio data J). Note that audio data for each frame at Step S8 is audio data Jt.

Next, the controller 11 generates face image data with expression(s) for the audio corresponding to the frames.

First, the controller 11 determines expression(s) to be added to the face image of the frames. For example, the controller 11 identifies each sentence/clause (each sentence/clause in text data after translation) corresponding to the audio data Jt corresponding to the frames, identifies an expression for the sentence/clause having been translated into the identified sentence/clause on the basis of the sentence/clause-expression data set E, and determines the identified expression as an expression to be added to the face image of the frames. Next, the controller 11 adds the expression to the face image data F on the basis of the expression determined for the frames and the expression parameter I stored in the storage 17, thereby generating face image data of the frames, and stores the generated face image data in the memory 16. Then, the controller 11 (i) changes the shape of the mouth in the face image data of the frames on the basis of the mouth shape data of the respective frames, thereby generating still images of the respective frames, (ii) combines the generated still images of the respective frames, thereby generating an amination, (iii) combines the generated animation with the audio data J, thereby generating video data H2, and (iv) stores the generated video data H2 in the storage 17.

After performing the animation generating process, the controller 11 causes the display 13 to display the animation and the audio output unit 14 to output the audio of the frames on the basis of the generated video data H1 or H2.

As described above, according to the display device 10, the controller 11 adds, on the basis of the text data B to which the audio data A has been converted, an expression(s) for an audio corresponding to the text data B to a face image which is displayed when the audio is output, and generates an animation in which the mouth contained in the face image with the expression(s) moves in sync with the audio.

For example, the controller 11 detects words/phrases from the text data B, obtains information on an expression correlated in advance with each word/phrase in each sentence/clause contained in the text data B, referring to the word/phrase-expression correspondence table T1, and determines an expression for each sentence/clause contained in the text data B on the basis of the obtained information. Then, the controller 11 adds the determined expression(s) to the face image which is displayed when the audio corresponding to the sentence (s)/clause (s) is output, and generates an animation in which the mouth contained in the face image with the expression(s) moves in sync with the audio.

Thus, the present invention can automatically generates, from one face image, an animation in which the expression changes according to the audio, and the mouse moves in sync with the audio. This can improve expressiveness of lip sync animations which are generated on the basis of face images. Further, this can eliminate complicated works, for example, a user judging at what timing what expression should be added and manually making adjustment while listening to audio, and hence makes it easy to generate lip sync animations with expressions for audios.

Further, the controller 11 translates the sentence (s)/clause (s) contained in the text data B into text data of another language, adds the expression(s) determined for the sentence (s)/clause (s) contained in the text data B, which is text data before translation, to the face image which is displayed when the audio corresponding to the sentence (s)/clause (s) contained in the text data of the other language, which is text data after translation, is output, and generates an animation in which the mouth contained in the face image with the expression(s) moves in sync with the audio corresponding to the text data of the other language, which is text data after translation.

Thus, the present invention can automatically generates, from one face image, an animation in which the expression changes according to the audio of a language (e.g., a foreign language) different from the original language, and the mouth moves in sync with the audio. This makes it easy to generate lip sync animations with expressions for audios even if users cannot understand languages of the audios.

The above embodiment is one of the preferred instances of the present invention, and is not intended to limit the present invention.

For example, in the above embodiment, the language of the audio data A is Japanese, but not limited thereto and hence may be another language, such as English.

Further, in the above embodiment, the video data H1 or H2 is generated on the basis of the audio data A and the face image data F. However, the present invention is also applicable to the case where video data is generated on the basis of text data to be converted to audio (text data for text-to-speech) and face image data.

Further, in the above embodiment, as a computer readable medium which stores the programs to perform various processes, an HDD, a nonvolatile semiconductor memory or the like is used. However, the present invention is not limited thereto. As the computer readable medium, a portable storage medium, such as a CD-ROM, can also be used. Further, as a medium to provide data of the programs via a communication line, a carrier wave can also be used.

The specific configuration and operation of the display device 10 can also be appropriately modified without departing from the spirit of the present invention.

In the above, an embodiment of the present invention is described. However, the scope of the present invention is not limited thereto. The scope of the present invention includes the scope of claims below and the scope of their equivalents.

What is claimed is:

1. An image processing device comprising:
a processor configured to:
    detect words or phrases within text of a sentence or a clause, wherein the text corresponds to audio to be reproduced;
    determine, for at least one of the words or phrases detected within the text of the sentence or the clause, a corresponding one of a plurality of word/phrase-expressions;
    determine that at least one of the words or phrases within the text of the sentence or the clause is a context-dependent word/phrase-expression;
    assign a most frequent one of the word/phrase-expression determined for the at least one of the words or phrases detected, while ignoring the context-dependent word/phrase-expression determined, as one of a plurality of sentence/clause-expressions to the text of the sentence or the clause; and
    generate frames of animation of a face of increased expressiveness to be displayed in sync with a reproduction of the audio, by at least performing:
        generate a mouth shape of a mouth of the face for each of the frames based on the words or phrases detected within the text; and
        generate an emotional expression of the face for each of the frames based on the one of the plurality of sentence/clause-expressions assigned to the text of the sentence or the clause.

2. The image processing device according to claim 1, wherein the processor is configured to:
    determine whether to generate the animation in a different language from that of the audio; and
    in response to determining to generate the animation in the different language from that of the audio:
        generate a mouth shape of the mouth of the face for each of the frames based on words or phrases detected within a text of audio in the different language; and
        generate the emotional expression of the face for each of the frames based on the one of the plurality of sentence/clause-expressions assigned.

3. A method comprising:
    detecting words or phrases within text of a sentence or a clause, wherein the text corresponds to audio to be reproduced;
    determining, for at least one of the words or phrases detected within the text of the sentence or the clause, a corresponding one of a plurality of word/phrase expressions;
    determining that at least one of the words or phrases within the text of the sentence or the clause is a context-dependent word/phrase-expression;
    assigning a most frequent one of the word/phrase-expression determined for the at least one of the words or phrases detected, while ignoring the context-dependent word/phrase-expression determined, as one of a plurality of sentence/clause-expressions to the text of the sentence or the clause; and
    generating frames of animation of a face of increased expressiveness to be displayed in sync with a reproduction of the audio, by at least:
        generating a mouth shape of a mouth of the face for each of the frames based on the words or phrases detected within the text; and
        generating an emotional expression of the face for each of the frames based on the one of the plurality of sentence/clause-expressions assigned to the text of the sentence or the clause.

4. The method according to claim 3, comprising:
    determining whether to generate the animation in a different language from that of the audio; and
    in response to determining to generate the animation in the different language from that of the audio:
        generating a mouth shape of the mouth of the face for each of the frames based on words or phrases detected within a text of audio in the different language; and
        generating the emotional expression of the face for each of the frames based on the one of the plurality of sentence/clause-expressions assigned.

5. A non-transitory computer readable storage medium storing a program to cause a computer to at least perform:
    detecting words or phrases within text of a sentence or a clause, wherein the text corresponds to audio to be reproduced;
    determining, for at least one of the words or phrases detected within the text of the sentence or the clause, a corresponding one of a plurality of word/phrase-expressions;
    determining that at least one of the words or phrases within the text of the sentence or the clause is a context-dependent word/phrase-expression;
    assigning a most frequent one of the word/phrase-expression determined for the at least one of the words or phrases detected, while ignoring the context-dependent word/phrase-expression determined, as one of a plurality of sentence/clause-expressions to the text of the sentence or the clause; and
    generating frames of animation of a face of increased expressiveness to be displayed in sync with a reproduction of the audio, by at least:
        generating a mouth shape of a mouth of the face for each of the frames based on the words or phrases detected within the text; and generating an emotional expression of the face for each of the frames based on the one of the plurality of sentence/clause-expressions assigned to the text of the sentence or the clause.

6. The non-transitory computer readable storage medium according to claim 5, wherein the program causes the computer to perform:
determining whether to generate the animation in a different language from that of the audio; and
in response to determining to generate the animation in the different language from that of the audio:
generating a mouth shape of the mouth of the face for each of the frames based on words or phrases detected within a text of audio in the different language; and
generating the emotional expression of the face for each of the frames based on the one of the plurality of sentence/clause-expressions assigned.

\* \* \* \* \*